United States Patent Office 3,044,560
Patented July 17, 1962

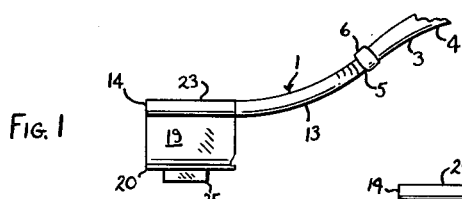
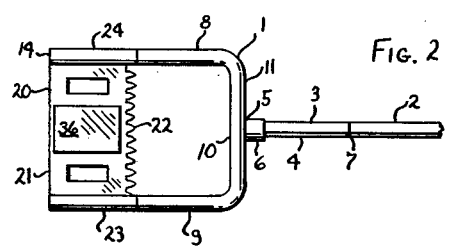
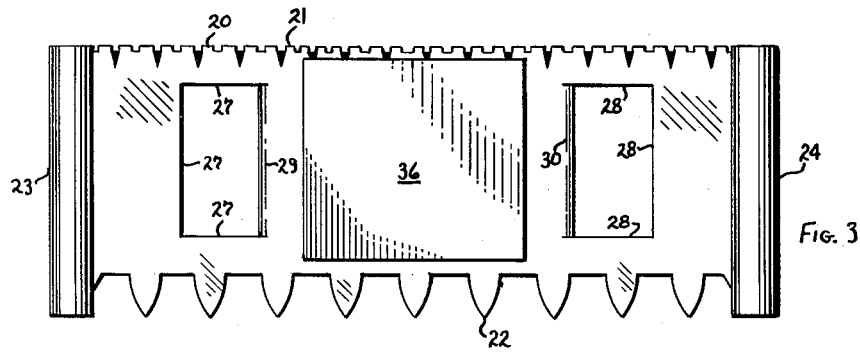
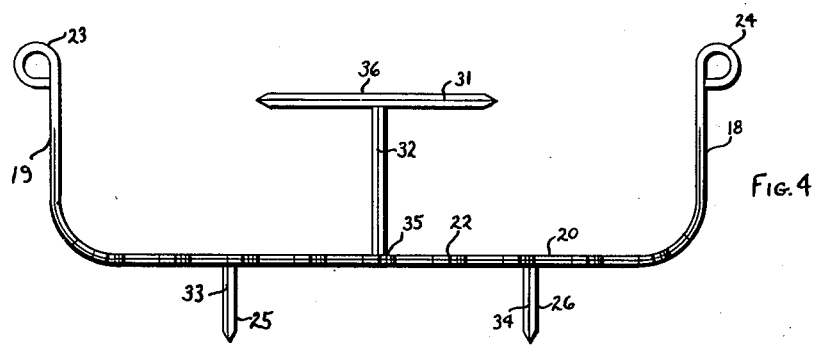
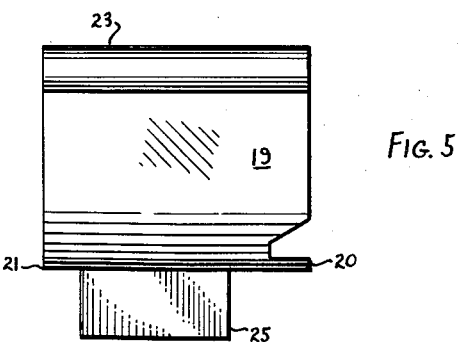

3,044,560
CULTIVATING TOOL
Echo T. Loomis, 604 Maryland Ave., Erie, Pa.
Filed Nov. 28, 1958, Ser. No. 776,838
1 Claim. (Cl. 172—375)

This invention relates to garden or lawn implements and, more particularly, to a cultivating tool.

This application is a continuation in part of patent application, Serial No. 519,859, filed July 5, 1955, which issued as Patent No. 2,873,809 on February 17, 1959.

The present application constitutes an improvement over the said application in that spaced blades are struck downwardly from the U-shaped blade and a T-shaped blade extends up from the center of the horizontal blade. The blades pulverize the earth, remove trash from the earth, and otherwise render the soil in form for a good seed bed.

More specifically, it is an object of the present invention to provide an improved garden tool.

Another object of the invention is to provide a garden tool with a U-shaped blade and upwardly and downwardly extending blades on the U-shaped blade and in combination with a specific handle.

A further object of the invention is to provide a garden tool which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

In the drawing:

FIG. 1 is a side view of a garden and lawn tool according to the invention;

FIG. 2 is a top view of the tool shown in FIG. 1;

FIG. 3 is a top view of the blade of the device shown in FIG. 2;

FIG. 4 is a rear view of the blade shown in FIG. 3; and

FIG. 5 is a side view of the blade.

Now with more specific reference to the drawing, a tool 1 is shown having a handle 2. A shank or tubular portion 3 is curved at 4 and bends downwardly and is attached to bifurcated tine portions at 5. A ferrule 6 is provided around the end of the tubular member 3 to strengthen it and hold the tool 1 in the handle 2. The handle 2 is received in the socket portion of the tubular portion 3 at 7 and rigidly attached thereto.

Resilient tines 8 and 9 are integrally attached together at 10 and extended outwardly generally perpendicular to the tubular portion 3 at 11 whereby a generally horizontal portion is provided upon which the operator can set his foot to obtain additional pressure during the process of edging sod around flower beds, shrubs, and the like. The tines 8 and 9 extend parallel to the ends of the portion 5 and then curve gently upwardly at 13 and terminate at distal ends 14. The distal ends 14 are received in tubular portions 23 and 24 of upturned ends 18 and 19 of a blade 20. The distal ends 14 are riveted or fixed in any suitable manner well known in the art.

The blade 20 is generally U-shaped with a flat intermediate portion having spaced members with sharpened edges 21 which are formed in irregular sawlike manner. A rear edge 22 provides a raking edge with the spaced protruding teeth forming the rake. The leading or cutting edge 21 and the rake edge 22 are both sharpened so that the tool 1 will positively cut through any weeds or grass roots which are not completely uprooted in the cultivating process, as well as breaking up hard and packed soil. The edges 22 may be blunt, however, to provide a more effective raking action.

An elongated T-shaped blade 36 has a vertical leg 32 and a cross bar 31, each having a knife edge. The leg 32 is welded at 35 on the upwardly facing surface of the blade 20. The edges of the leg 32 and the cross bar 31 are sharpened so as to accelerate the cultivating action by breaking up any remaining portion of hard and packed soil which passes between the upturned ends 18 and 19 of the blade 20. Spaced, downwardly extending blades 25 and 26 are formed by portions of the blade 20 which are cut out at 27 and 28 and stretch downwardly at 29 and 30. Sharpened edges 33 and 34 and corresponding opposite edges make the tool 1 suitable to perform a harrowing and pulverizing action, expediting the cultivating function of the tool 1.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A tool of the class described comprising a generally U-shaped blade made of flat material, a handle, the ends of said blade being turned up and attached at their distal ends to said handle, the edge of the intermediate portion of said blade remote from said handle having spaced notches with members therebetween, said members being sharpened on their leading edges, said blade having spaced teeth on the trailing edge thereof, and a T-shaped member on the upper side of said blade, said T-shaped member having a member thereof defining the bar of said T-shaped member attached to an intermediate part of said blade and extending upwardly perpendicular thereto, the bar of said T being generally parallel to the horizontal part of said blade, the bar of said T-shaped member being in the form of a plate disposed generally parallel to said up turned ends of said blade, and spaced, downwardly extending blades attached to the lower side of said blade, said spaced blades being disposed in planes parallel to the planes of said upturned ends.

References Cited in the file of this patent

UNITED STATES PATENTS

| 54,087 | Allen | Apr. 24, 1866 |
|---|---|---|
| 54,916 | Jenkins | May 22, 1866 |
| 794,119 | Richardson | July 4, 1905 |
| 1,299,417 | Bailey | Apr. 8, 1919 |
| 2,245,692 | Lamb | June 17, 1941 |
| 2,873,809 | Loomis | Feb. 17, 1959 |

FOREIGN PATENTS

| 378,947 | Germany | Dec. 27, 1936 |
|---|---|---|
| 8,806 | Great Britain | Apr. 14, 1909 |